April 2, 1940.  E. B. HUDSON  2,196,071
INTERNAL COMBUSTION ENGINE
Filed Feb. 25, 1938  3 Sheets-Sheet 2
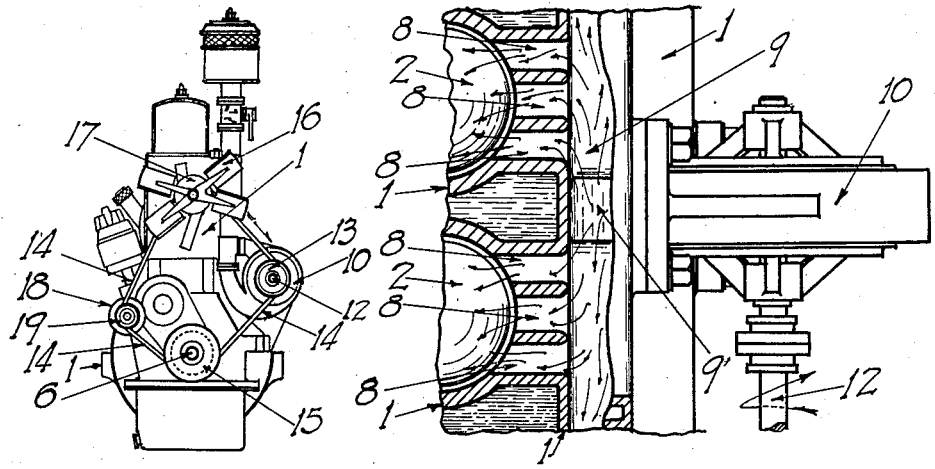
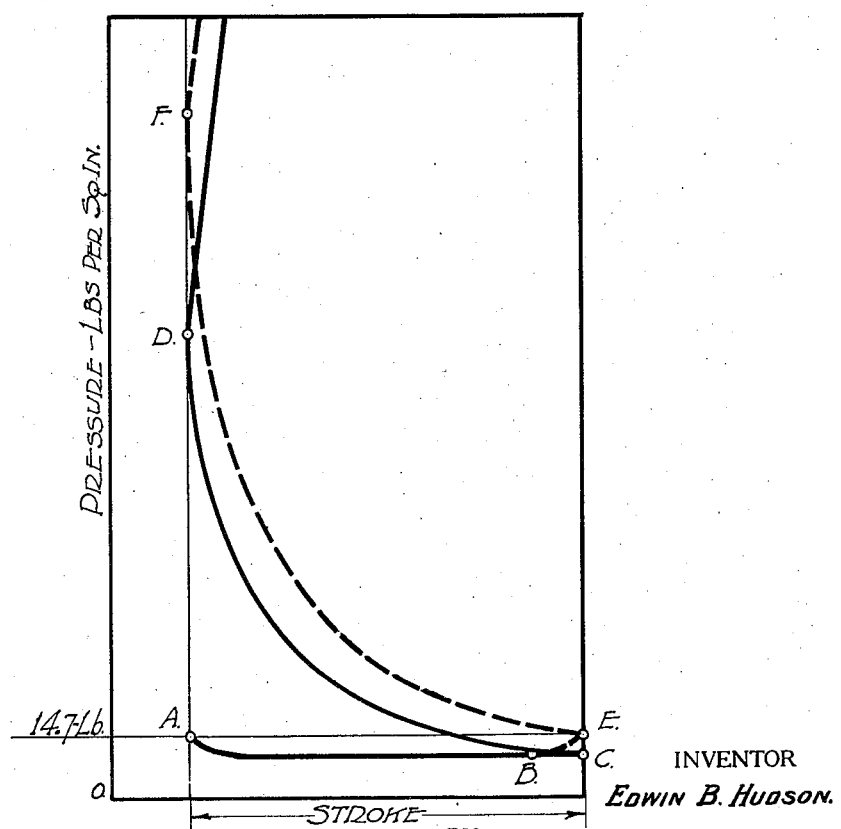
INVENTOR
*Edwin B. Hudson.*
BY
*Allen & Allen*
ATTORNEYS.

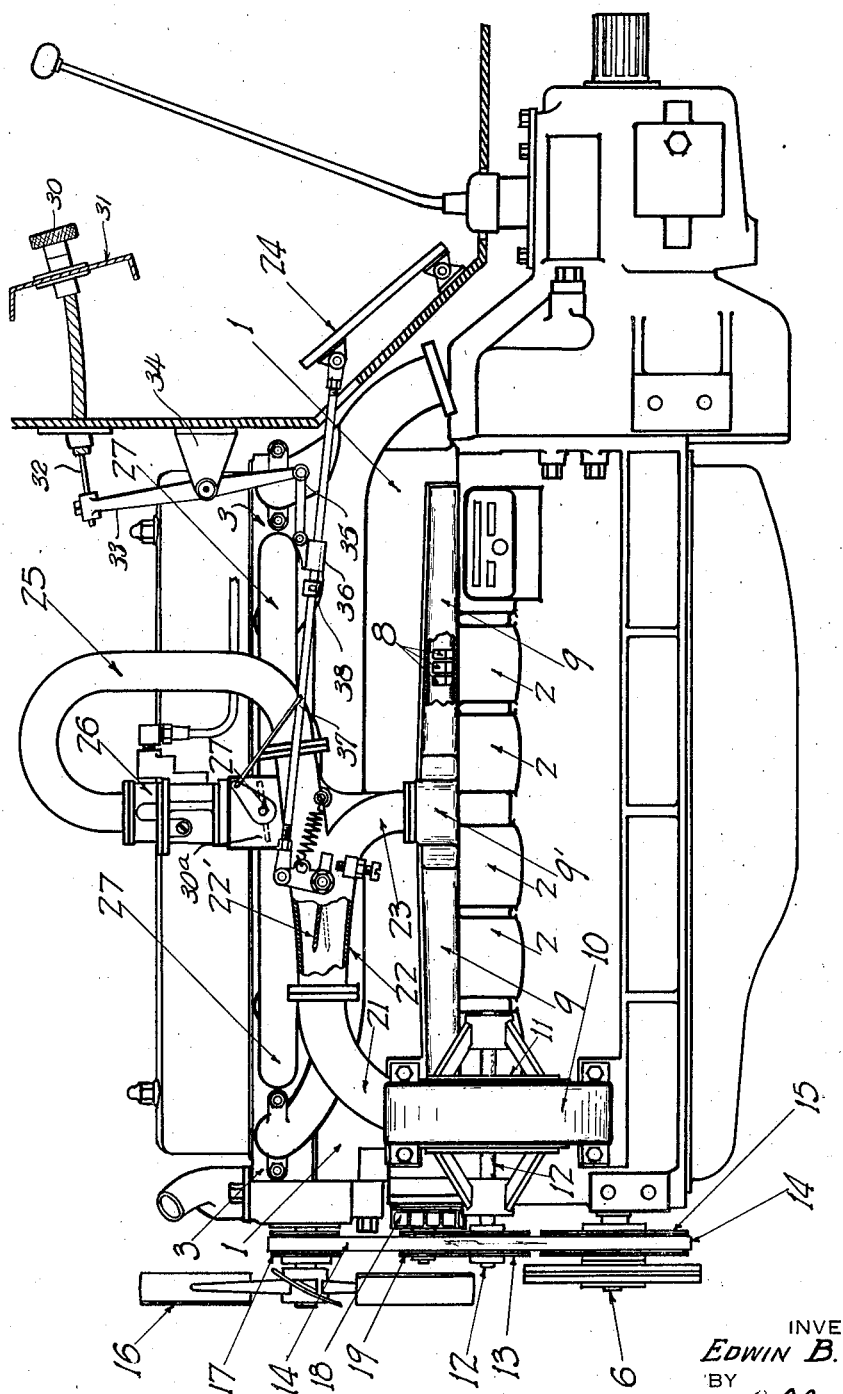

Patented Apr. 2, 1940

2,196,071

UNITED STATES PATENT OFFICE 2,196,071

INTERNAL COMBUSTION ENGINE

Edwin B. Hudson, Middletown, Ohio

Application February 25, 1938, Serial No. 192,592

14 Claims. (Cl. 123—75)

My invention relates to improvements in the design of four stroke internal combustion engines, such as automotive engines or the like. It is well known that automotive engines operate most of the time at a fractional horse power rating; but due to the public demand for speed and acceleration a larger engine is used than would otherwise be necessary. This type of operation greatly increases fuel requirements.

The object of my invention is to improve the thermal efficiency of the larger engines while operating at fractional rating. I accomplish this result by a very simple improvement that means practically no change in the conventional engine design except the incorporation of my invention.

Other objects of the invention are:

To provide a four stroke internal combustion engine capable of high thermal efficiency at fractional load rating, as encountered in propelling a motor car or the like, and to provide means for increasing the terminal pressure at the end of the suction stroke to a constant value to compensate for the varying volumetric efficiency by the introduction of additional air at the end of the suction stroke.

To provide a conventional four stroke internal combustion engine with three ports, two of which are the conventional mechanically operated intake and exhaust ports located in the upper part of the cylinder and one additional port located in the lower part of the cylinder which is uncovered by the piston for the admission of air under pressure above atmospheric to bring the suction pressure to a constant value.

To provide a four stroke internal combustion engine cylinder charged with a gasoline air mixture in the upper portion of the cylinder and air in the lower portion of the cylinder having available oxygen more completely to burn the fuel charge. The burning of the gasoline air mixture above a charge of air in the cylinder simulates the burning of the fuel in a Diesel engine where an excess of air is always present. The excess of air in both cases insures that extra oxygen is available, and that the engine will run cooler since the extra air has to be brought up to a higher temperature, expanding the air and contributing energy to the piston. Thus less heat is transmitted to the cooling water and more heat is converted to useful work.

The provision of an air charged engine which combines the best features of a four stroke gasoline engine and the Diesel engine, viz., flexibility and fuel economy.

My invention is disclosed in two forms having the same objectives as described, one of which I add air at the end of the suction stroke to bring the compression pressure to up to the desired value while the fuel air mixture is drawn into the cylinder in the conventional manner by the pistons, the intake manifold having a pressure lower than atmospheric. The second form, the air is added at the end of the suction stroke as described, but in this disclosure the fuel-air mixture is supplied to the intake manifold under pressure above atmospheric, insuring a better distribution of the fuel-air mixture to all cylinders. In this arrangement the conventional throttle valve used on the conventional carburetor is dispensed with, and in its place a proportioning valve is used.

These and other objects which will be readily understood by those skilled in the art upon reading these specifications, I accomplish by that certain construction and arrangement of parts of which I shall now set forth an exemplary embodiment. Reference is now made to the drawings, wherein:

Fig. 2 is a front view of the engine to illustrate the V belt drive from the crankshaft driving the blower fan, the radiator cooling fan and the electric generator.

Fig. 3 is a sectional view taken along the lines 1—1 of Fig. 1.

Fig. 4 is a diagram that illustrates the advantage of admitting additional air at the end of the suction stroke.

Fig. 5 shows air elevation of a typical eight cylinder automotive engine on which my invention is used, whereby air is added at the end of the suction stroke as described and in addition the intake manifold supplying the various cylinders with the fuel air mixture is under pressure above atmospheric.

Figure 1:
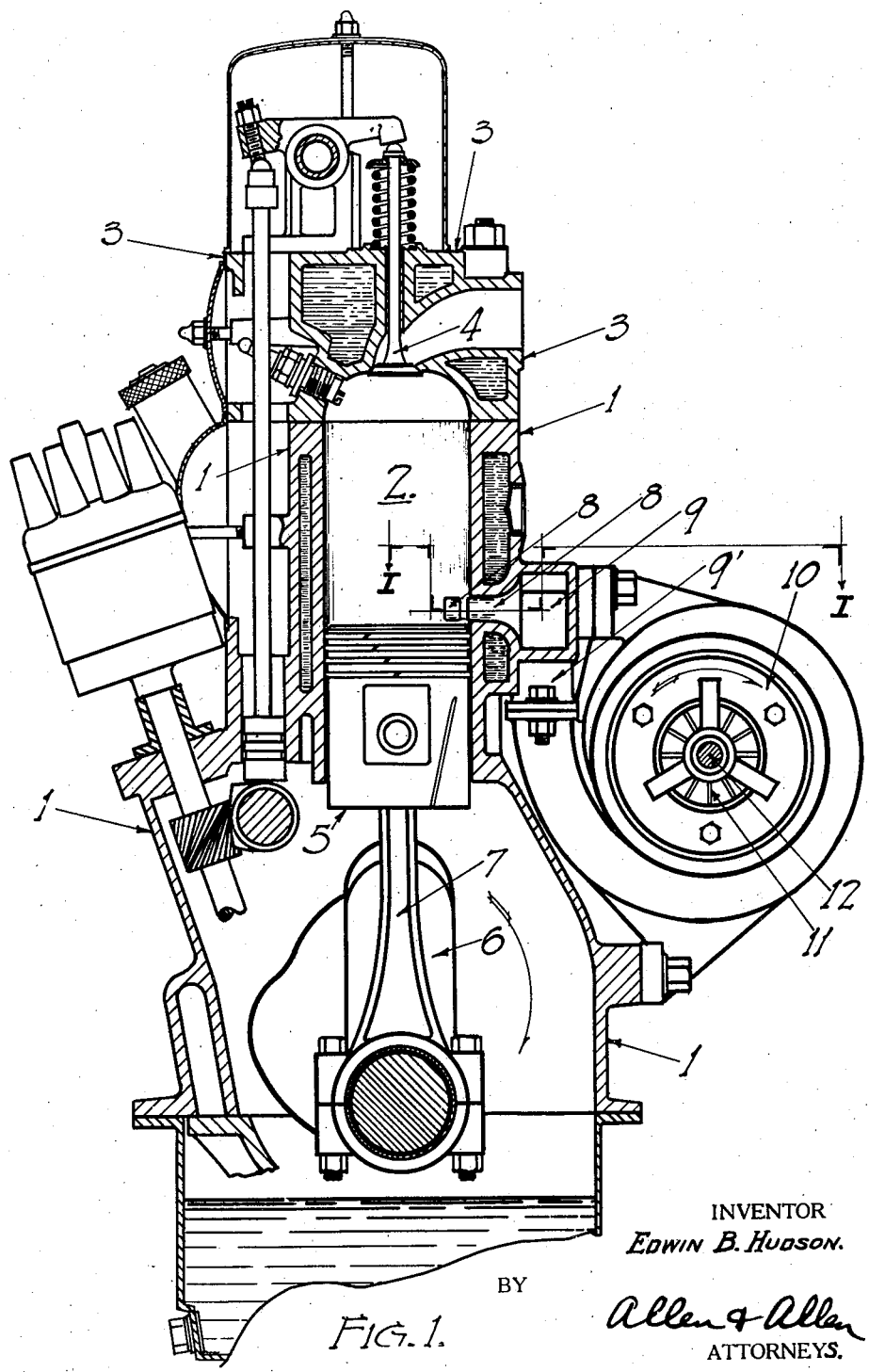
Figure 1 is a sectional view of a four stroke internal combustion engine with the blower fan, air manifold and air entry ports at the lower end of the cylinder.

My invention is applicable to any conventional four stroke internal combustion engine regardless of the arrangement of the mechanically operated valves.

Briefly, in the practice of my invention, I employ means for providing additional air during the latter portion of the suction stroke in an internal combustion engine. This air is admitted under pressure through a third port at the bottom of the engine cylinder which is uncovered by the piston shortly before reaching its full down stroke. This additional air increases the terminal pressure at the end of the suction stroke to at or about atmospheric pressure. Also it provides a surplus of oxygen to insure complete burning of the fuel. Under these conditions, the gasoline-air mixture forms the upper strata of the charge, while air forms the lower portion of the charge. This simulates to a degree the conditions encountered in the Diesel charge after the oil is admitted, i. e., the excess air is concentrated over the piston.

In the conventional four stroke engine, operating as it does in an automobile, the amount of gasoline air mixture entering the cylinder is controlled by throttling to drive at the desired speed. Thus, if less fuel mixture is admitted, the compression pressure is lowered, and the fuel requirements become greater. My invention, however, operates to burn the fuel admitted to the engine cylinder at the highest possible thermal efficiency whether the cylinder is fractionally charged or fully charged.

In my invention the total amount of air admitted to the cylinder is always the same. The gasoline-air mixture is admitted through the mechanically operated intake valve in the conventional manner. At fractional horse power operation the gasoline-air mixture will only partly fill the cylinder; but at the end of the suction stroke air is then added to fill the cylinder. Under the various operating conditions the cylinder charge may comprise, for example, 60% gasoline air mixture and 40% air, or 70% gasoline-air mixture and 30% air; but in any case the cylinder is fully charged. Clearly this is not possible in the conventional engine under like conditions.

In my invention, since the cylinder is always completely filled, the charge will always be compressed to the same high value at which the best thermal efficiency is realized. Since the cylinder is completely filled, (the upper strata with the gasoline air mixture and the lower with make up air), the conditions occurring in a Diesel engine are simulated, i. e., the compression pressure is practically constant, the total amount of air admitted is constant, the amount of fuel is varied, the engine will operate at lower temperature as there is more air to heat, less heat will be transmitted to the cooling water, and more heat will be developed into power.

As contrasted with this, the conventional four stroke gasoline engine has low thermal efficiency, because no matter what the speed or load, the temperature within the cylinder is always the same, and large quantities of heat are transmitted to the cooling water in the form of waste.

My invention is not to be confused with the supercharged four stroke engine used on aircraft and sometimes in automobiles. The supercharger is a device for supplying the gasoline air mixture under pressure in order to fill the engine cylinder, particularly where the engine is operating at higher altitudes than sea level. There exists no valid reason for supercharging automotive engines as they operate at fractional load ratings about 90% of the time.

My invention will also improve the thermal efficiency of supercharged air craft engines as it is the usual practice to operate these engines at 65% rating after the take off. By adding air at the end of the suction stroke as described, the fuel requirements will be reduced. This will cause the engine to run cooler, which is a particular advantage in the air cooled type of engine. By reducing the fuel requirements, the pay load can be increased or the radius of operations increased with the same fuel load.

In my air charged engine no fuel is included in the air charged at the end of the suction stroke, the added air making up the difference between the terminal pressure of the suction stroke and the desired terminal pressure. To those skilled in the art, it is well known that the terminal suction pressure and the resulting compression pressure determine the thermal efficiency, and that these values should be as high as is consistent with good practice. With these pressures at the proper value throughout the speed-load range of the engine, the fuel requirements will be greatly improved. The addition of air at the beginning of the exhaust stroke offers the advantage that the burned gases are completely expelled from the cylinder, thus eliminating the possibility of burner gases contaminating the fuel mixture admitted on the next suction stroke.

In the drawings, I have shown an engine having a cylinder block 1, defining the cylinder 2. The block has a cylinder head 3 and valve means 4, of which there are two, one for the intake and one for the exhaust as respects each cylinder.

The conventional valve actuating means are shown, but do not require special description since they are familiar to the art. The piston 5 operates in the cylinder 2 and is connected to the crankshaft 6 by the usual connecting rod 7.

These members are all conventional parts of an internal combustion engine, and my drawings indicate a conventional four-stroke type of engine.

In the practice of my invention, I provide an additional port 8 in the wall of the cylinder 2. This port is so located that it is uncovered by the piston 5 at the lower end of the piston stroke, as clearly shown in Fig. 1. It will be understood that a port 8 is provided for each cylinder of the engine. Each such port communicates with a manifold 9 through which air under pressure can be supplied to all of the cylinders of the engine. This pressure may be supplied by a blower fan 10, the rotor 11 of which is driven by a shaft 12. As indicated in Fig. 2, this shaft may be provided with a V-pulley 13, which engages the V-belt 14 also employed to drive the cooling fan 16, by pulley 17, and the electrical generator 18, by pulley 19. The V-belt, of course, engages the drive pulley 15 on the stub end of the crankshaft 6. The blower 10 is connected with the manifold 9 as at 9'. The blower will serve to furnish air to the cylinder 2 at the end of the suction stroke to make up the difference between the terminal pressure within the cylinder and the desired terminal pressure. Thus the charge in each cylinder can always be compressed to substantially the same value, giving a high thermal efficiency.

Fig. 4 is a chart in which suction and pressure in the engine cylinders are plotted for the stroke. A, B, and C represents the suction curve, while C, D represents the compression curve, under normal conditions, in a four-stroke engine running at fractional volumetric efficiency and without my invention. When the point C is below the line A, E which represents atmospheric pressure, then the compression pressure at D is lower than the desired value. This results in low thermal efficiency. With my invention, the suction pressure curve becomes A, B, E, the pressure increasing sharply upwardly at B, E, due to the additional air let into the cylinder 2 through the ports 8. The compression curve then becomes E, F, instead of C, D, as in the conventional engine.

Since the point F is at the desirable compression pressure at which maximum thermal efficiency occurs, the fuel admitted to the cylinder 2 will exert the maximum energy of that fuel upon the piston 5. The same amount of fuel admitted to a conventional engine cylinder with a thermal pressure represented by the point C in Fig. 4 will exert only a fractional part of the energy which is realized when my invention is used. As a consequence, the conventional engine will have to have a higher throttle setting and will use more fuel to develop the same horsepower. On the other hand, at higher speeds, and with the throttle full open, the conventional engine will deliver less power than the air charged engine of my invention, because the compression pressure drops off rapidly at high engine speeds. With the air charged engine of my invention the compression pressure is maintained at the higher value and the power curve will not drop off at the same rate.

Thus with the admission of additional air through the ports 8 into the several cylinders, the compression pressure will always approximate the compression pressure F but cannot drop as low as the point D on the chart of Fig. 4. Therefore the same thermal efficiency will be attained throughout the entire speed-load range; as can be attained in the conventional engine only under the most favorable speed-load conditions.

In order further to improve the operation of the four-stroke internal combustion engine, means are provided to supply the fuel-air mixture in the intake manifold 27 under pressure above atmospheric to insure an even distribution to each of the engine cylinders 2. Reference is had to Fig. 5 where the blower 10 is driven as previously described. Blower 10 is connected to a proportioning valve 22 having a hinged gate 22', by conduit 21 as shown. Proportioning valve 22—22' and throttle valve 30ª are controlled by the foot accelerator 24 as shown, which positions hinged gate 22' to divert a portion of the air supplied through conduit 21 to each of the two conduits 23 and 25. A hand throttle control 30 is mounted in any convenient manner on the dash board 31 for push-pull movement. The stem 32 thereof is connected to one end of a lever 33 pivoted on a bracket as at 34. A link 35 connects the other end of the lever 33 with a slide 36 on the foot accelerator rod 37. The foot accelerator rod 37 is linked to the throttle valve 30ª. The slide 36 is adapted to cooperate with a stop 38 fixed on the rod 37, all as shown in Figure 5. The amount of air supplied to either conduits 23 and 25 is varied by the position of the hinged gate 22'; but the total amount of air passing through both conduits 23 and 25 is equal to the amount of air supplied by conduit 21. The air passing the lower side of hinged gate 22' will pass through conduit 23 to connection 9', thence to air manifold 9, and into the cylinders 2 via ports 8. The air passing above the hinged gate 22' goes into the conduit 25, thence to carburetor 26 where the air picks up the fuel charge in the proper proportion, and thence to the intake manifold 27 where it is distributed under pressure to the various cylinders 2, via mechanically operated intake valves 4. Proportioning valve 22—22' regulates the speed and output of the engine by diverting more air through the carburetor 26 to increase the power and speed, and vice versa. The blower 10 must have a capacity equal to the pumping capacity of the engine plus sufficient air to scavage the cylinders on the exhaust stroke. The air requirements vary as the speed of the engine, as does also the blower capacity to supply the air.

Under these favorable conditions, the relation of the speed of the engine and the speed of the blower is constant. The pressure of air delivered by blower 10 varies as the square of the speed, giving higher pressures at higher speeds when the time interval for admission through the ports and valves is the shortest.

The application of my invention to aircraft engines is highly desirable as it will improve the thermal efficiency and cause the engine to run at lower operating temperature, which is particularly advantageous in the air cooled types. On such installations however, the blower 10 should be proportioned to compensate for the lower atmospheric pressures encountered at higher altitudes, as will be clear.

Modifications may be made in my invention without departing from the spirit thereof.

Having thus described my invention, what I claim as new and desire to secure by Letters Patent is:

1. An internal combustion engine having at least one cylinder and piston with inlet and outlet ports, means for supplying to said cylinder a mixture of fuel and air on the suction stroke, means effective at the end of said suction stroke to admit air to said cylinder to bring the fluid pressure therein to a predetermined level, and means for supplying air under pressure, said means having a connection to both said last mentioned means.

2. An internal combustion engine having at least one cylinder and piston with inlet and outlet ports, means for supplying to said cylinder a mixture of fuel and air on the suction stroke, means effective at the end of said suction stroke to admit air to said cylinder to bring the fluid pressure therein to a predetermined level, said means comprising a connection to the interior of said cylinder at the lower end of the piston stroke, and means for supplying air under pressure, said means having a connection to both said last mentioned means.

3. In an internal combustion engine at least one cylinder having a piston, inlet and outlet ports for said cylinder located essentially beyond the point of completion of the stroke of said piston, said cylinder having another port located slightly above commencement point of the stroke of said piston, means for supplying air under pressure, said means having a connection to said inlet port including a carburetor, and also having a connection to said last mentioned port, and means for controlling the relative proportions of air passing through said connections.

4. An internal combustion engine having a series of cylinders with pistons, inlet and outlet ports for said cylinders located near the ends thereof, a manifold connecting said inlet ports, said cylinders also having ports located so as to be uncovered by said pistons near the commencement of their respective strokes, a manifold connecting said last mentioned ports, and means for supplying air under pressure, said means having connections to both said manifolds.

5. In an internal combustion engine a cylinder, a piston in said cylinder, an inlet port for said cylinder located beyond the end of the stroke of said piston, said cylinder having another port located near the beginning of the stroke of said piston, a means for supplying air under pressure, a connection between said means and said inlet port, said connection including means for the addition of fuel, and a connection between said means for supplying air under pressure and said other port.

6. In an internal combustion engine a cylinder, a piston in said cylinder, an inlet port for said cylinder located beyond the end of the stroke of said piston, said cylinder having another port located near the beginning of the stroke of said piston, a means for supplying air under pressure, a connection between said means and said inlet port, said connection including means for the addition of fuel, a connection between said means for supplying air under pressure and said other port, and a proportioning valve common to said two connections.

7. In an internal combustion engine of the multi-cylinder type, the cylinders having pistons and inlet and outlet valves and valve actuating mechanism, an inlet manifold, a carburetor connected to said manifold, ports in the walls of said cylinders located slightly above the point of completion of the intake stroke of the pistons of said cylinders, a manifold communicating with said ports, a source of air under pressure in connection with said engine, and connections from said source of air to said carburetor and to said last mentioned manifold respectively, and means for controlling the amount of air fed from said source through said two connections.

8. In an internal combustion engine of the multi-cylinder type, the cylinders having pistons and inlet and outlet valves and valve actuating mechanism, an inlet manifold, a carburetor connected to said manifold, ports in the walls of said cylinders located slightly above the point of completion of the intake stroke of the pistons of said cylinders, a manifold communicating with said ports, a source of air under pressure in connection with said engine, and connections from said source of air to said carburetor and to said last mentioned manifold respectively, and means for controlling the amount of air fed from said source through said two connections, said connections having a common portion, and said controlling means comprising a proportioning valve located in said common portion.

9. Apparatus as claimed in claim 14, wherein said engine has also a pulley on the crankshaft, a fan and a pump, and a belt driven from said pulley to said fan and pump, and in which said belt drive serves also as a belt drive for said source of air under pressure.

10. An internal combustion engine having a series of cylinders with pistons, inlet and outlet ports for said cylinders located near the ends thereof, a manifold connecting said inlet ports, said cylinders also having ports located so as to be uncovered by said pistons near the commencement of their respective strokes, a manifold connecting said last-mentioned ports, means for supplying air under pressure, said means having connections to both said manifolds, and means for controlling the relative amounts of air under pressure passing from said means for supplying air through said several connections.

11. A process of operating a 4-stroke cycle combustion engine having cylinders, which includes the steps of supplying to said cylinders on the suction stroke a mixture of air and fuel under greater than atmospheric pressure, and at the completion of the suction stroke supplying air without fuel to said cylinders under greater than atmospheric pressure to bring the compression pressure in said cylinders to a predetermined value, irrespective of the specific amount of air and fuel admitted to said cylinders.

12. A process of operating a 4-stroke cycle internal combustion engine having cylinders, which includes the steps of conducting air under greater than atmospheric pressure through a device to add fuel thereto to said cylinders so as to cause a fuel and air mixture under greater than atmospheric pressure to enter said cylinders on the suction stroke, and at the end of the suction stroke supplying to said cylinders additional air under pressure without fuel, said air being derived from the same source, whereby to cause the compression pressure of said cylinders to remain substantially the same irrespective of the relative amounts of fuel and air mixture and of air so supplied, and controlling the operation of said engine by proportioning the amounts of air from said source which are admitted to said cylinders in said two manners.

13. In an internal combustion engine at least one cylinder having a piston, inlet and outlet ports for said cylinder located essentially beyond the point of completion of the stroke of said piston, said cylinder having another port located slightly above the commencement point of the stroke of said piston, and means for supplying air under pressure, said means having a connection to said inlet port including a carburetor, and also having a connection to said last mentioned port.

14. In an internal combustion engine of the multi-cylinder type having throttle means, the cylinders having pistons and inlet and outlet valves and valve actuating mechanism, an inlet manifold, a carburetor connected to said manifold, ports in the walls of said cylinders located slightly above the point of completion of the intake stroke of the pistons of said cylinders, a manifold communicating with said ports, a source of air under pressure in connection with said engine, said connections from said source of air to said carburetor and to said last mentioned manifold respectively, and means for controlling the amount of air fed from said source through said two connections, said connections having a common portion, and said controlling means comprising a proportioning valve located in said common portion, and a connection between said proportioning valve and throttle means.

EDWIN B. HUDSON.